(12) United States Patent
Tamaoka

(10) Patent No.: US 7,511,398 B2
(45) Date of Patent: Mar. 31, 2009

(54) MOTOR AND RECORDING DISK DRIVING DEVICE

(75) Inventor: Takehito Tamaoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 11/307,502

(22) Filed: Feb. 10, 2006

(65) Prior Publication Data

US 2006/0176612 A1    Aug. 10, 2006

(30) Foreign Application Priority Data

Feb. 10, 2005    (JP)    ............... 2005-035008

(51) Int. Cl.
  *H02K 1/12*    (2006.01)
  *H02K 1/14*    (2006.01)
(52) U.S. Cl. .............. 310/254; 310/216; 310/67 R
(58) Field of Classification Search ............... 310/254, 310/216, 90, 67 R; 360/99.08
  See application file for complete search history.

(56) References Cited

U.S. PATENT DOCUMENTS

| | | | |
|---|---|---|---|
| 4,626,727 A | | 12/1986 | Janson |
| 5,319,270 A | * | 6/1994 | Tanaka et al. ............. 310/67 R |
| 5,604,389 A | * | 2/1997 | Nitta et al. ................ 310/67 R |
| 5,694,268 A | * | 12/1997 | Dunfield et al. .......... 360/98.07 |
| 5,793,129 A | * | 8/1998 | Parsoneault et al. ........... 310/42 |
| 6,013,965 A | * | 1/2000 | Suzuki et al. ............... 310/186 |
| 6,104,114 A | * | 8/2000 | Takeda et al. ................. 310/90 |
| 6,208,050 B1 | * | 3/2001 | Fujii et al. ..................... 310/90 |
| 6,242,831 B1 | * | 6/2001 | Khan .......................... 310/90 |
| 6,661,150 B2 | * | 12/2003 | Utsumi ....................... 310/254 |
| 6,979,931 B1 | * | 12/2005 | Gustafson et al. ........... 310/254 |
| 2003/0174915 A1 | * | 9/2003 | Parsoneault et al. ......... 384/110 |
| 2003/0205942 A1 | * | 11/2003 | LeBlanc et al. ............... 310/90 |
| 2004/0061404 A1 | * | 4/2004 | Fujii et al. ................... 310/216 |
| 2004/0222712 A1 | | 11/2004 | Hong et al. |
| 2004/0233576 A1 | * | 11/2004 | Khan et al. ............. 360/99.08 |

FOREIGN PATENT DOCUMENTS

| | | |
|---|---|---|
| JP | H06-022526 A | 1/1994 |
| JP | H09-128884 A | 5/1997 |
| JP | H11-032466 A | 2/1999 |
| JP | H11-196557 A | 7/1999 |
| JP | 11275782 A * | 10/1999 |
| JP | 2000083354 A * | 3/2000 |

* cited by examiner

*Primary Examiner*—Burton Mullins
*Assistant Examiner*—Alex W Mok
(74) *Attorney, Agent, or Firm*—Volentine & Whitt, PLLC

(57) ABSTRACT

A base plate is provided with plural through holes extending vertically through the base plate, at the portions aligned with plural teeth. In the respective through holes of the base plate, the lower portions of wire-wound portions of the corresponding teeth and the lower portions of the coils formed around the wire-wound portions are inserted. The lower surfaces of the wire-wound portions are positioned between the upper main surface and the lower main surface of the base plate in the axial direction.

13 Claims, 8 Drawing Sheets

MOTOR AND RECORDING DISK DRIVING DEVICE

BACKGROUND OF THE INVENTION

1. Field of the Invention

The present invention relates to electric motors and recording disk driving devices including a motor.

2. Background Art

Conventionally, recording-disk driving devices such as hard-disk devices include a spindle motor (hereinafter, referred to as "a motor") for rotating and driving a recording disk. In recent years, recording-disk driving devices have been mounted on portable music players, etc., and, therefore, there has been a need for recording disk driving devices with large capacities, reduced sizes and reduced thicknesses. Accordingly, there has been a need for motors with reduced sizes and thicknesses as the driving power sources of such recording disk driving devices.

In order to reduce the thickness of a motor, if an attempt is made to reduce the base plate for mounting the stator and the like thereon, this will degrade the rigidity of the base plate, thus resulting in the occurrences of vibrations or deformation of the base plate during the driving of the motor.

BRIEF SUMMARY OF THE INVENTION

An exemplary electric motor of the present invention includes a stationary section including a stator and a base portion, a rotor section including a rotor magnet and a bearing section for supporting the rotor section rotatably with respect to the stationary section.

The stator includes plural teeth radially placed about a center axis, and each tooth has a coil formed from a wire wound around said tooth.

The base portion is placed at the lower side of the stator and includes a through hole which is formed at a place facing at least one of said plural teeth in an axial direction.

The axially lower surface of said tooth is positioned at a lower position than the upper surface of said base portion in said axial direction.

In the description of the present invention, the terms "upper," "lower," "left" and "right" representing the positional relationships and the orientations of respective components will merely describe the positional relationships and the orientations in the drawings and will not describe the positional relationships and the orientations in actual apparatuses.

The exemplary electric motor according to the present invention enables reducing the thickness of the motor without excessively reducing the thickness of the base plate.

DETAILED DESCRIPTION OF THE INVENTION

Hereinafter, with reference to FIG. 1 to FIG. 8, embodiments of the present invention will be described.

First Embodiment

Figure 1:
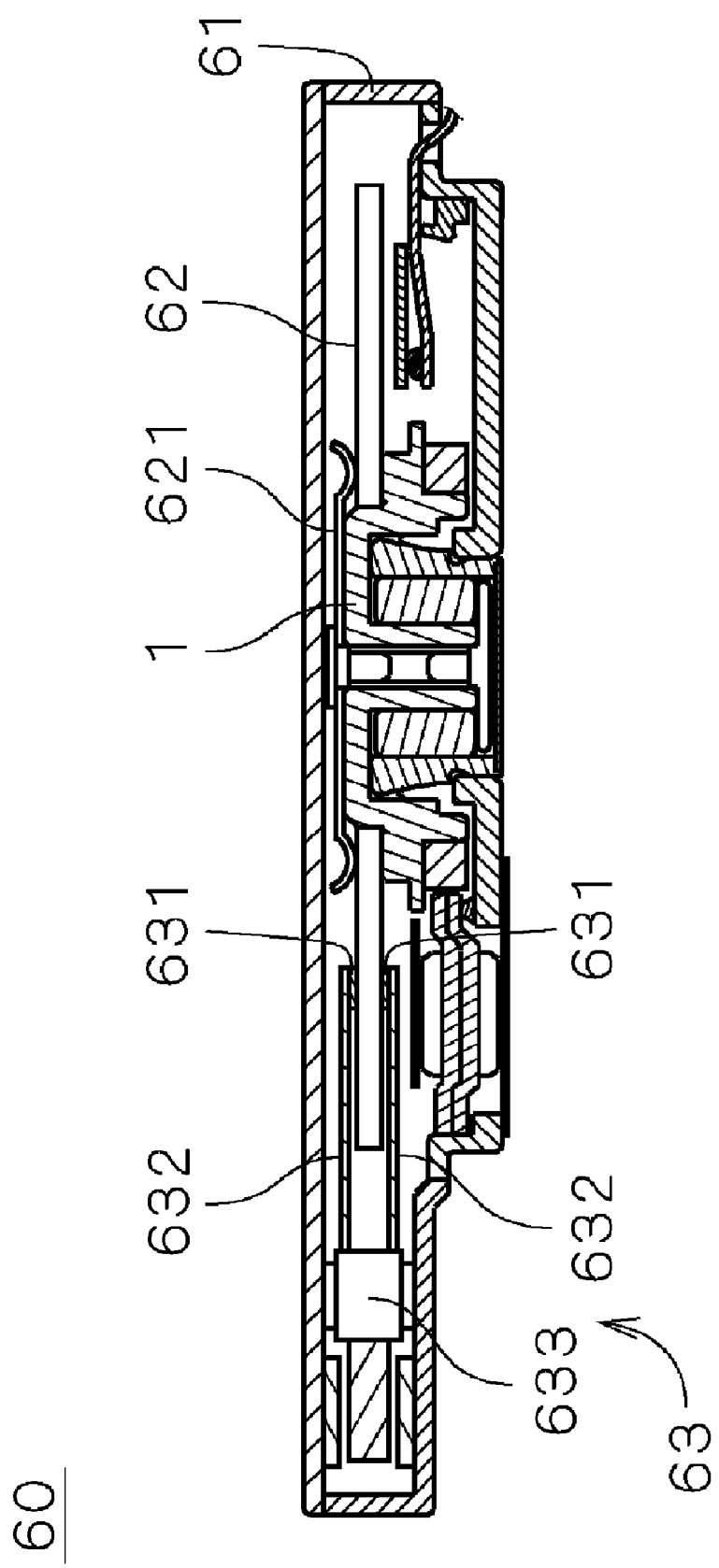
FIG. 1 is a view illustrating the internal structure of a disk driving device according to a first embodiment.

FIG. 1 is a view illustrating the internal structure of a disk driving device 60 including an electric spindle motor 1 (hereinafter, referred to as "a motor 1") according to a first embodiment of the present invention. In the present embodiment, the disk driving device 60 is a hard-disk device. The disk driving device 60 includes a housing 61 having an internal space. The housing 61 houses a disk-shaped recording disk 62 for storing information, an accessing portion 63 for writing and/or reading information onto and/or from the recording disk 62, and the motor 1 for rotating the recording disk 62. The recording disk 62 is mounted on the upper side of the motor 1 and is secured to the motor 1 through a clamper 621.

The accessing portion 63 includes a head 631 provided near the recording disk 62 for magnetically writing and reading information thereonto and therefrom, an arm 632 for supporting the head 631, and a head moving mechanism 633 which moves the arm 632 for changing the position of the head 631 relative to the recording disk 62. Through the aforementioned structures, the head 631 accesses a desired position on the recording disk 62 and writes or reads information thereonto or therefrom, while being placed near the recording disk 62.

Figure 2:
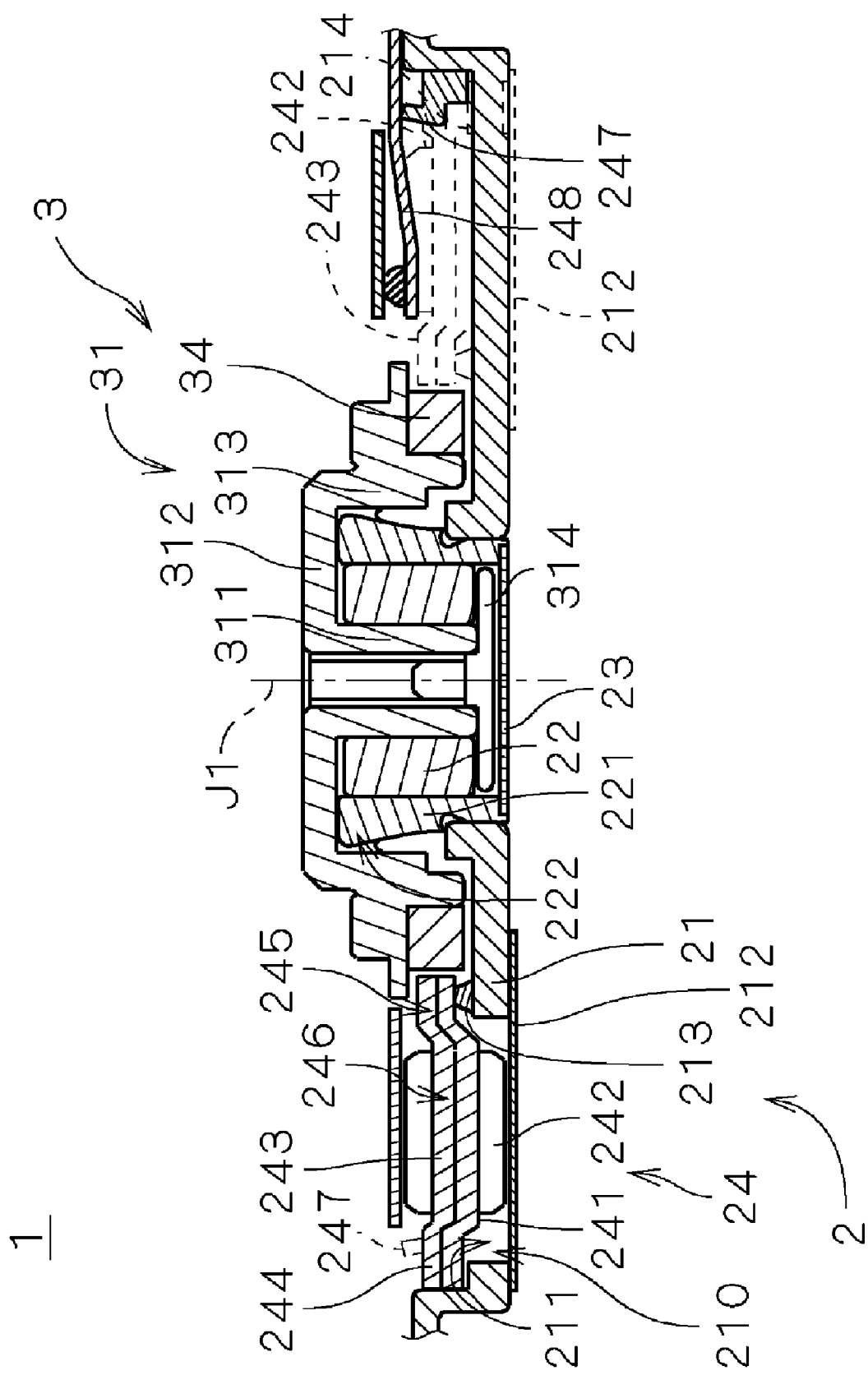
FIG. 2 is a longitudinal cross-sectional view illustrating the motor of FIG. 1.

FIG. 2 is a longitudinal cross-sectional view illustrating the structure of the disk-driving motor 1. FIG. 2 illustrates a cross section along a cut surface including the center axis J1 of the motor 1. Further, FIG. 2 illustrates, by a broken line, a portion of the structure positioned at the side deeper than the cut surface (this applies to FIG. 6).

As illustrated in FIG. 2, the motor 1 includes a stationary section 2 and a rotor section 3, wherein the rotor section 3 is supported by a bearing mechanism utilizing a fluid dynamic pressure of a lubricating oil such that it is rotatable about the center axis J1 with respect to the stationary section 2. Hereinafter, description will be provided on the assumption that the rotor section 3 is the upper side and the stationary section 2 is the lower side along the center axis J1, for convenience. However, it is not necessary that the center axis J1 is in coincidence with the direction of gravity.

The rotor section 3 includes a rotor hub 31 and a rotor magnet 34 which generates a rotational force (torque) about the center axis J1 between the rotor section 3 and a stator 24 which will be described later. The rotor hub 31 is integrally formed from a stainless steel or the like and includes a shaft 311 having substantially a cylindrical shape about the center axis J1 and protruding in the downward direction (namely, toward the stationary section 2), a disk portion 312 having substantially a disk shape and extending perpendicularly to the center axis J1 from the upper end portion of the shaft 311, and a cylindrical portion 313 having substantially a cylindrical shape and protruding downwardly from the outer edge of the disk portion 312. A flange 314 having substantially a disk shape is mounted to the shaft 311 at the lower tip end portion thereof.

The stationary section 2 includes a base plate 21 having substantially a disk shape, a substantially-cylindrical sleeve 22 and a sleeve holding portion 221 for rotatably supporting the rotor section 3, and a stator 24 placed around the sleeve 22 and the sleeve holding portion 221. The base plate 21 forms a portion of the housing 61 of the disk driving device 60 and is formed by applying press working to a plate-shaped member made of aluminum, an aluminum alloy or a magnetic or non-magnetic iron. The sleeve holding portion 221 having substantially a cylindrical shape is inserted and secured in the center opening portion of the base plate 21. The sleeve 22 is inserted in the sleeve holding portion 221 protruding upwardly from the center portion of the base plate 21 and is secured therein through an adhesive or the like. At the upper portion of the sleeve holding portion 221, a flange portion 222 protruding outwardly with respect to the center axis J1 is formed integrally therewith. Further, the opening of the sleeve 22 at its lower end is closed by a sealing cap 23 having substantially a disk shape.

The stator 24 is mounted to the base plate 21 from thereabove through press fitting or bonding and includes a core 241 made of two laminated silicon-steel plates and plural coils 242 provided around predetermined portions of the core 241. The silicon-steel plates constituting the core 241 have a thickness in the range of 0.1 to 0.35 mm and, more preferably, a thickness of 0.2 mm.

Figure 3:
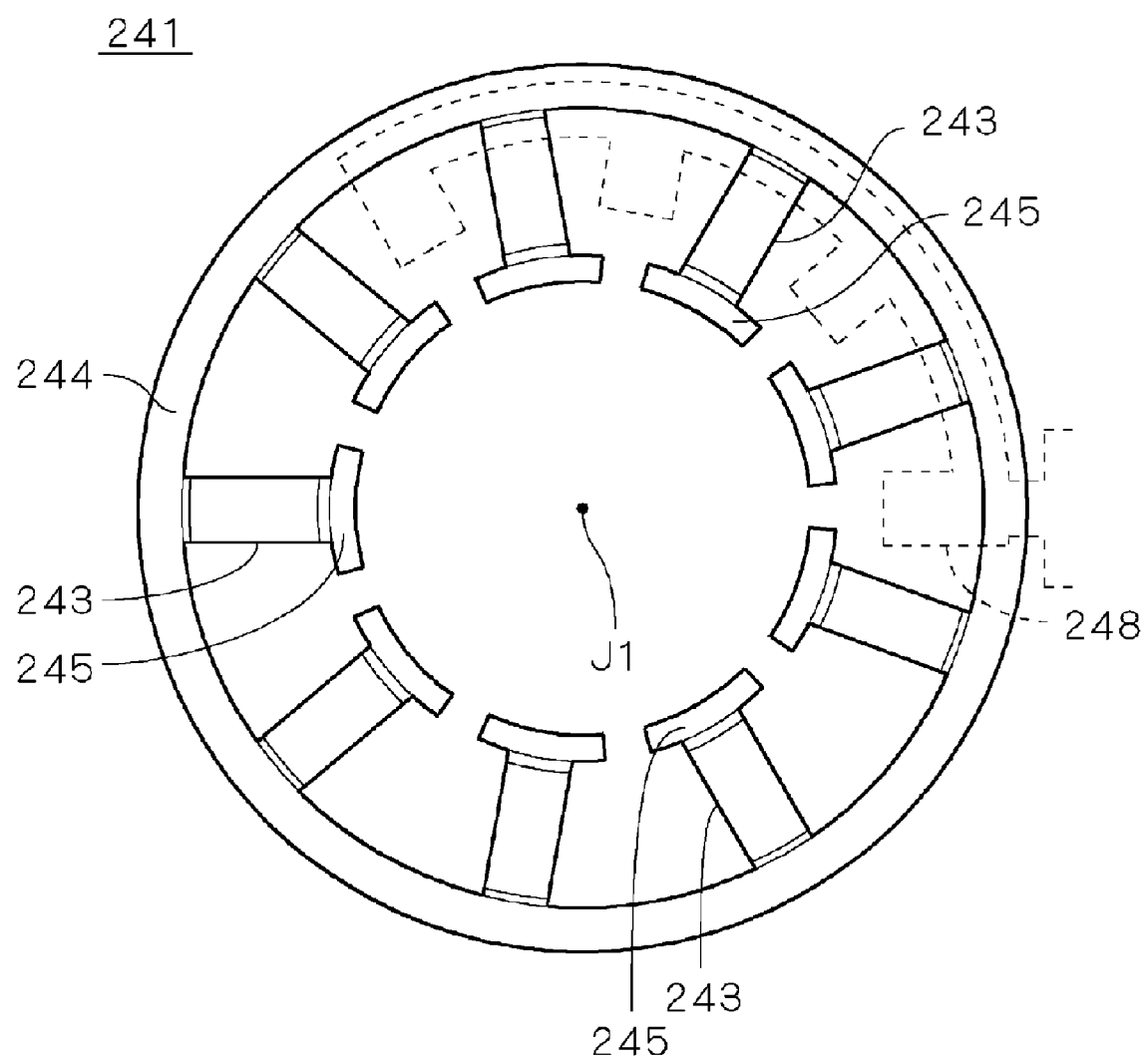
FIG. 3 is a plan view illustrating the core of the motor of FIG. 2.

FIG. 3 is a plan view illustrating the core 241. As illustrated in FIG. 3, the core 241 includes plural teeth 243 (nine teeth, in the present embodiment) which are placed radially about the center axis J1 and an annular-shaped supporting ring 244 which supports the plural teeth 243 at the outer perimeter of the plural teeth 243. The plural teeth 243 and the portions of the supporting ring 244 corresponding to the teeth are formed integrally with each other from the silicon-steel plates constituting the core 241 and, therefore, the plural teeth 243 and the supporting ring 244 are magnetically connected to each another.

The respective teeth 243 include magnet-facing portions 245 extending circumferentially about the center axis J1, at their end portions closer to the center axis J1 (namely, their end portions opposite from the supporting ring 244). As illustrated in FIG. 2, in the motor 1, the magnet-facing portions 245 of the respective teeth 243 are faced with the outer circumferential surface of the rotor magnet 34, which enables generating a torque between the stator 24 and the rotor magnet 34 with high efficiency.

Figure 4:
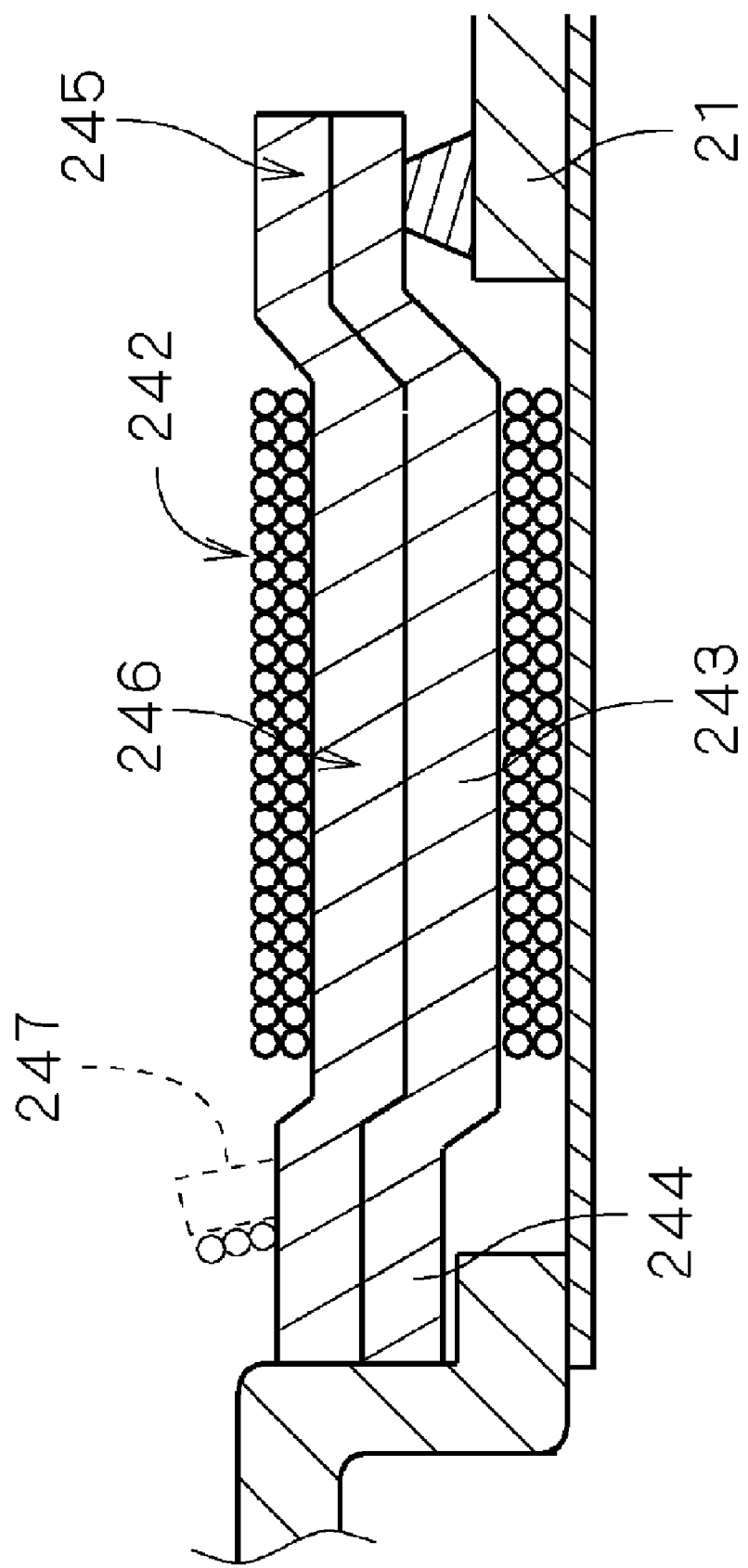
FIG. 4 is a longitudinal cross-sectional view illustrating portions of the stator and the base plate, in an enlarging manner.

FIG. 4 is a longitudinal cross-sectional view illustrating portions of the stator 24 and the base plate 21, in an enlarging manner, by focusing attention on a single tooth 243. As illustrated in FIG. 4, the teeth 243 of the core 241 are folded at two portions, such that the portions 246 between the magnet-facing portions 245 of the teeth 243 and the supporting ring 244 are downwardly protruded. The coils 242 are formed from wires which are wound around the downwardly-folded portions 246 of the teeth 243 into two layers. The wires have a diameter in the range of 0.05 to 0.3 mm (more preferably, 0.1 mm).

Hereinafter, the portions 246 of the respective teeth 243 around which the wires are wound will be referred to as "wire-wound portions 246." As illustrated in FIG. 2 and FIG. 4, the wires extended from the respective coils 242 are directed to a circuit board 248 illustrated in FIG. 2 and FIG. 3 through bridging-wire engaging protrusions 247 formed between adjacent teeth 243 and are bonded to an electrode on the circuit board 248 through soldering. In FIG. 3, the circuit board 248 is illustrated by a broken line.

Figure 5:
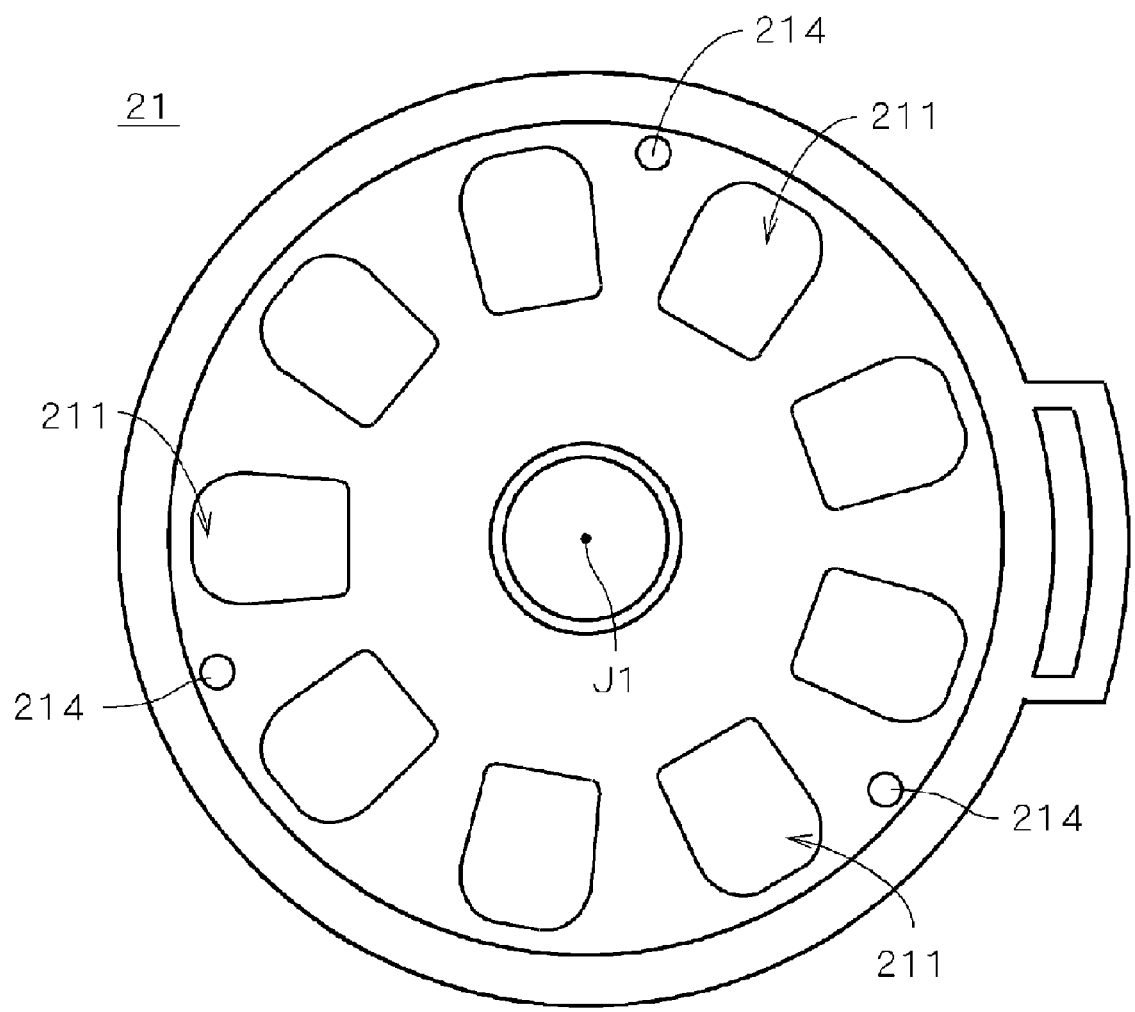
FIG. 5 is a plan view illustrating the base plate.

FIG. 5 is a plan view illustrating the base plate 21. As illustrated in FIG. 5, at the center portion of the base plate 21, there is formed an opening for inserting the sleeve holding portion 221 (see FIG. 2) therethrough. The base plate 21 includes plural through holes 211 extending vertically through the base plate 21 at the portions thereof aligned with the plural teeth 243 (see FIG. 2). The base plate 21 preferably has a thickness of 0.1 mm or more at the portions thereof around the through holes 211, in view of preventing the deformation due to vibrations and the like during the driving of the motor 1. Also, the base plate 21 preferably has a thickness of 1 mm or less at the portions thereof around the through holes 211, in view of reduction of the thickness of the motor 1. In the present embodiment, the base plate 21 has a thickness of 0.4 mm at the portions thereof around the through holes 211.

Further, as illustrated in FIG. 2 and FIG. 5, the base plate 21 includes three stator-supporting portions 214 protruding upwardly from the upper surface of the base plate 21. The stator-supporting portions 214 are circumferentially arranged at even intervals about the center axis J1 and abut the supporting ring 244 of the stator 24 mounted on the base plate 21 to support the stator 24 at the lower side thereof. The three stator-supporting portions 214 are formed integrally with the base plate 21 during forming the base plate 21 through press working.

As illustrated in FIG. 2, at the state where the stator 24 is mounted on the base plate 21, the lower portions of the wire-wounded portions 246 of the teeth 243 are inserted in the respective through holes 211 of the base plate 21, and the lower surfaces of the wire-wound portions 246 are positioned between the upper surface and the lower surface of the base plate 21. The lower end surfaces of the coils 242 provided around the wire-wound portions 246 are also positioned between the upper surface and the lower surface of the base plate 21. In other words, portions of the respective plural teeth 243 and portions of the respective coils 242 are housed within the corresponding through holes 211 of the base plate 21, without being downwardly protruded beyond the lower surface of the base plate 21.

In the stator 24, an adhesive 210 is filled in the through holes 211 in which the teeth 243 and the coils 242 are inserted, so that the teeth 243 and the coils 242 are secured thereby and the through holes 211 are sealed thereby. In FIG. 2, for ease of understanding of the figure, illustration of the adhesive 210 is omitted and the position of the adhesive 210 filled therein is designated by the reference character (this applies to FIG. 6).

As illustrated in FIG. 2, the base plate 21 includes a sheet-type sealing member 212 (for example, a flexible circuit board or a nameplate) which closes the plural through holes 211 at the lower side of the base plate 21. The sealing member 212 is attached to the lower main surface of the base plate 21 through an adhesive, a tackiness agent or the like.

The base plate 21 further includes plural (nine) protrusion-type teeth-supporting portions 213 which protrude upwardly from the upper surface of the base plate 21 and abut the lower sides of the magnetic-facing portions 245 to support the magnetic-facing portions 245. The teeth-supporting portions 213 may be either formed during the forming of the base plate 21 through press working or formed as a member separated from the base plate 21 and then bonded to the formed base plate 21.

Next, there will be described the bearing mechanism utilizing a fluid dynamic pressure for rotatably supporting the rotor section 3 of the motor 1 on the stationary section 2. As illustrated in FIG. 2, in the motor 1, there are provided small gaps between the lower surface of the disk portion 312 of the rotor hub 31 and the upper end surface of the sleeve holding portion 221, between the inner circumferential surface of the sleeve 22 and the outer circumferential surface of the shaft 311, between the lower end surface of the sleeve 22 and the upper surface of the flange 314, between the lower surface of the flange 314 and the upper surface of the sealing cap 23, and between the outer circumferential surface of the flange portion 222 of the sleeve 22 and the inner circumferential surface of the cylindrical portion 313 of the rotor hub 31. A lubricating oil is filled in these gaps in a continuous manner.

The flange portion 222 has, at its outer circumferential surface, an inclined surface having an outer diameter which is gradually reduced in the downward direction, while the cylindrical portion 313 of the rotor hub 31 which is faced to the outer circumferential surface of the flange portion 222 is formed to have an inner circumferential surface with a constant inner diameter. Accordingly, the interface of the lubricating oil in the gap between the flange portion 222 and the cylindrical portion 313 is created to have a meniscus shape due to the capillary action and the surface tension. Further, the gap between the flange portion 222 and the cylindrical portion 313 serves as a taper seal to prevent the lubricating oil from being discharged therefrom. Further, the lubricating oil retained in the gap between the flange portion 222 and the cylindrical portion 313 also serves as an oil sump.

On the upper end surface of the sleeve holding portion 221 and on the lower end surface of the sleeve 22, there are formed plural grooves for generating, in the lubricating oil, pressures toward the center axis J1 during the rotation of the rotor section 3, and these end surfaces and the surfaces facing therewith constitute a thrust dynamic-pressure bearing section. These grooves are, for example, plural spiral-shaped grooves or plural herring-bone grooves.

Further, on the opposing surfaces of the shaft 311 and the sleeve 22, there are formed grooves for generating fluid dynamic pressures in the lubricating oil, and these surfaces constitute a radial dynamic-pressure bearing section. These grooves are, for example, plural herring-bone grooves provided on the inner circumferential surface of the sleeve 22 at its upper and lower portions in the direction of the center axis J1.

In the motor 1, the bearing mechanism utilizing fluid dynamic pressures supports the rotor section 3 through the lubricating oil in a non-contacting manner, thereby enabling rotating the rotor section 3 with high accuracy and low noise. Particularly, the bearing mechanism according to the present embodiment can further suppress abnormal contacts between the shaft 311 and the sleeve 22 due to air voids generated in the lubricating oil and leakage of the lubricating oil due to the expansion of air within the bearing, since no air exists within the bearing.

As described above, in the motor 1, the lubricating oil which is fluid is filled in the gaps between the sleeve 22 and the sleeve holding portion 221 and the shaft 311 and the disk portion 312. Thus, during the rotation of the rotor section 3, the rotor section 3 is supported through the fluid dynamic pressures of the lubricating oil. Further, the rotor section 3 is driven to be rotated about the center axis J1 with respect to the stationary section 2, which drives the recording disk 62 (see FIG. 1) mounted to the rotor section 3 to rotate it.

Next, there will be described a method for fabricating the stator 24 and a method for mounting the stator 24 to the base plate 21. First, the stator 24 is formed as follows. A flat-plate type silicon-steel plate (or another type of magnetic-steel plate) is shaped in conformance to the shape of the core 241, through stamping, to form a core member. Then, press working is applied to the portions of the core member corresponding to the wire-wound portions 246 such that these portions are folded to be downwardly protruded. Further, press working is applied to the portions of the core member corresponding to the magnetic-facing portions 245 such that these portions are upwardly folded.

Next, two core members are laminated and then secured to each other through caulking or laser welding. Then, an insulation resin is applied to the surface of the laminated core members through electrolytic deposition, powder coating or the like to form a core 241. After the formation of the core 241, wires are wound around the wire-wound portions 246 of the teeth 243 into two layers with a coil winder to form coils 242. At this time, the wires in the first layer are wound from the sides of the respective wire-wound portions 246 opposite from the center axis J1 to the sides closer to the center axis J1 and, thereafter, the wires in the second layer are wound from the sides closer to the center axis J1 to the outer sides. Then, the wires extended from the coils 242 are connected to a circuit board 248 to complete the fabrication of the stator 24.

Then, the stator 24 is mounted onto the base plate 21 while the outer circumferential surface of the supporting ring 244 is maintained abutted with the base plate 21. At this time, the stator 24 may be either mounted onto the base plate 21 through press fitting or may be adhered thereto through an adhesive which has been applied in advance to the portion of the base plate 21 to be abutted with the supporting ring 244. The aforementioned method for fabricating the stator 24 and the aforementioned method for mounting the stator 24 to the base plate 21 are similarly employed in a second embodiment which will be described later.

As previously described, the lower end surfaces of the wire-wound portions 246 of the teeth 243 are positioned between the upper surface and the lower surface of the base plate 21, which enables reducing the thickness of the motor 1 without excessively reducing the thickness of the base plate 21. Further, the base plate 21 can be formed to have a thickness in the range of 0.1 mm to 1 mm, which can prevent the deformation of the base plate 21 due to vibrations and the like during the driving of the motor 1 and also can realize reduction of the thickness of the motor 1. This motor 1 having such a reduced thickness is particularly suitable as the driving power source of a disk driving device 60 such as a hard-disk device which has been required to have a further reduced thickness.

In the motor 1, the plural through holes 211 can be easily closed by the sealing member 212 at the side of the base plate 21 opposite from the stator 24 mounted thereon (namely, the side of the motor 1 which is faced to the outside). Further, the lower end surfaces of the coils 242 are positioned between the upper surface and the lower surface of the base plate 21, which can prevent the coils 242 from protruding below the base plate 21. This enables easily attaching the sealing member 212 to the base plate 21, thereby enabling easily closing the plural through holes 211.

In the motor 1, the adhesive 210 filled in the through holes 211 for securing the teeth 243 serves as a shock-absorbing member against the vibrations of the teeth 243. This can suppress the vibrations of the teeth 243 during the operation of the motor 1 (for example, switching vibrations generated at the time of switching among poles). Further, the magnet-facing portions 245 of the teeth 243 having a thin-and-long shape are supported, at the lower sides thereof, by the teeth-supporting portions 213, which can suppress the vibrations of the magnet-facing portions 245 of the teeth 243 with higher certainty.

On the other hand, in the case of the motor of a conventional disk driving device, if vibrations of the teeth occur during operation, this will cause unstable magnetic biasing force and, therefore, cause unstable rotations of the rotor section, thus resulting in the occurrence of PESs (Positioning Error Signals). PESs indicate that the head can not follow the tracks on a recording disk and can not successfully write or read information onto or from the recording disk, namely tracking errors. Further, vibrations of the teeth may cause Puretones (unusual noises caused by resonance between the stator and the rotor, and the like). Further, in the case of a motor including a bearing mechanism utilizing fluid dynamic pressures, if vibrations of the magnetic-facing portions of the teeth occur, this may cause RROs (Repeatable Run Out). RROs are deflections of syncronization components of the shaft during the operation of the motor. As previously described, the motor 1 can certainly suppress the vibrations of the teeth 243, thereby suppressing the occurrence of PESs, Puretones and RROs caused by vibrations of the teeth 243.

Second Embodiment

Figure 6:
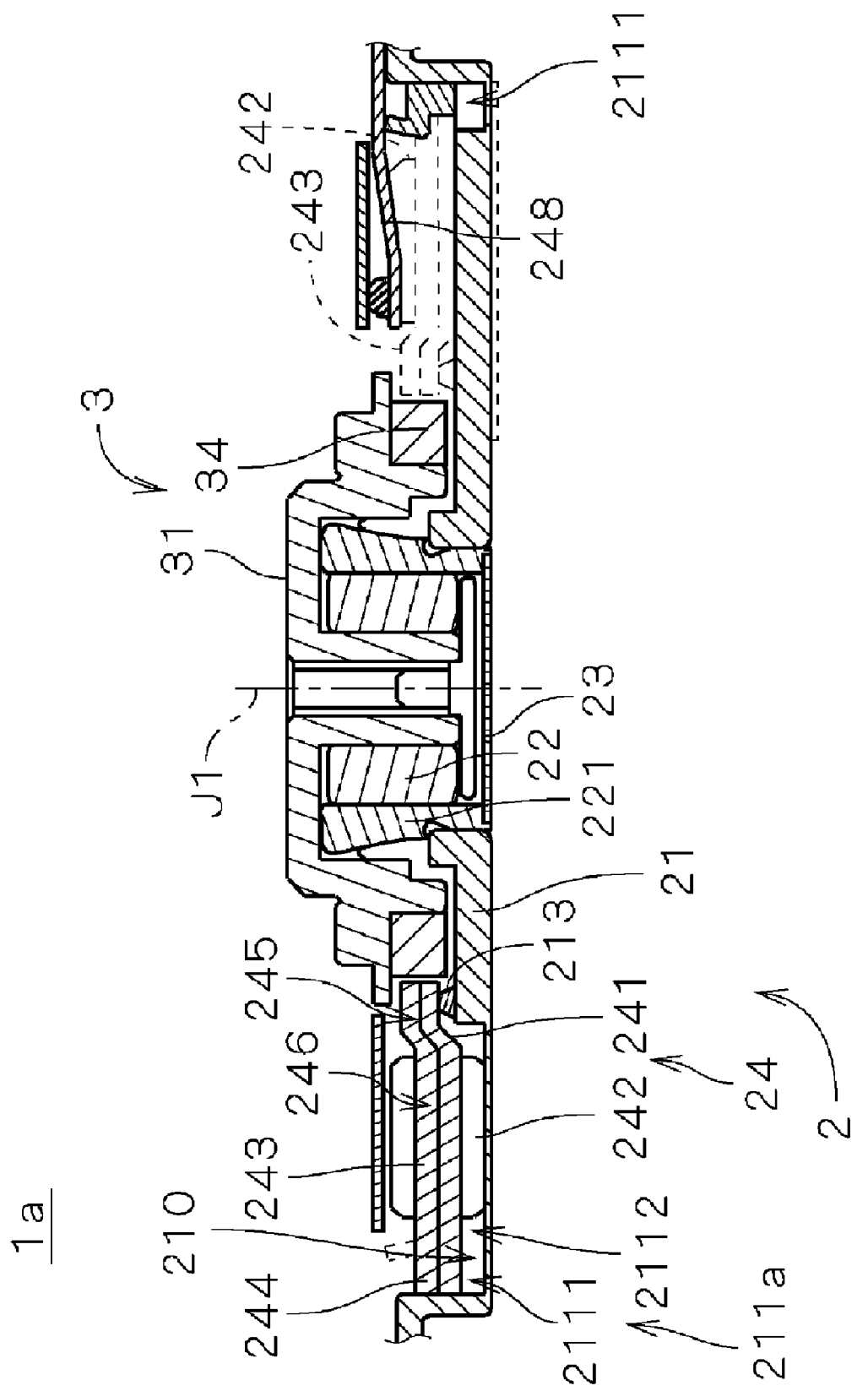
FIG. 6 is a longitudinal cross-sectional view illustrating the structure of a motor according to a second embodiment.

Next, there will be described a motor 1*a* according to a second embodiment of the present invention. FIG. 6 is a longitudinal cross-sectional view illustrating the structure of the motor 1*a*. As illustrated in FIG. 6, instead of the through holes 211 of the motor 1 illustrated in FIG. 2, a recessed portion 211*a* is formed on the base plate 21 in the motor 1*a*. The other structures are the same as those in FIG. 2 and will be designated by the same reference characters in the following description.

As illustrated in FIG. 6, the motor 1*a* includes a stationary section 2 and a rotor section 3, wherein the rotor section 3 is supported by a bearing mechanism utilizing fluid dynamic pressures of a lubricating oil such that it is rotatable about the center axis J1 with respect to the stationary section 2, similarly to in the first embodiment.

The bearing mechanism of the motor 1*a* also has the same structure as that in the first embodiment. The rotor section 3 includes a rotor hub 31 and a rotor magnet 34, while the stationary section 2 includes a base plate 21, a sleeve 22, a sleeve holding portion 221, a sealing cap 23 and a stator 24. The stator 24 is mounted to the base plate 21 from thereabove and includes a core 241 and plural coils 242.

The core 241 of the motor 1*a* includes a supporting ring 244 and plural teeth 243 (nine teeth, in the present embodiment) each having a wire-wound portion 246, wherein the supporting ring 244 is positioned on the same plain as the wire-wound portions 246. Further, similarly to in the first embodiment, the teeth 243 are upwardly folded near the magnet-facing portions 245 and the magnet-facing portions 245 are faced to the outer circumferential surface of the rotor magnet 34.

Figure 7:
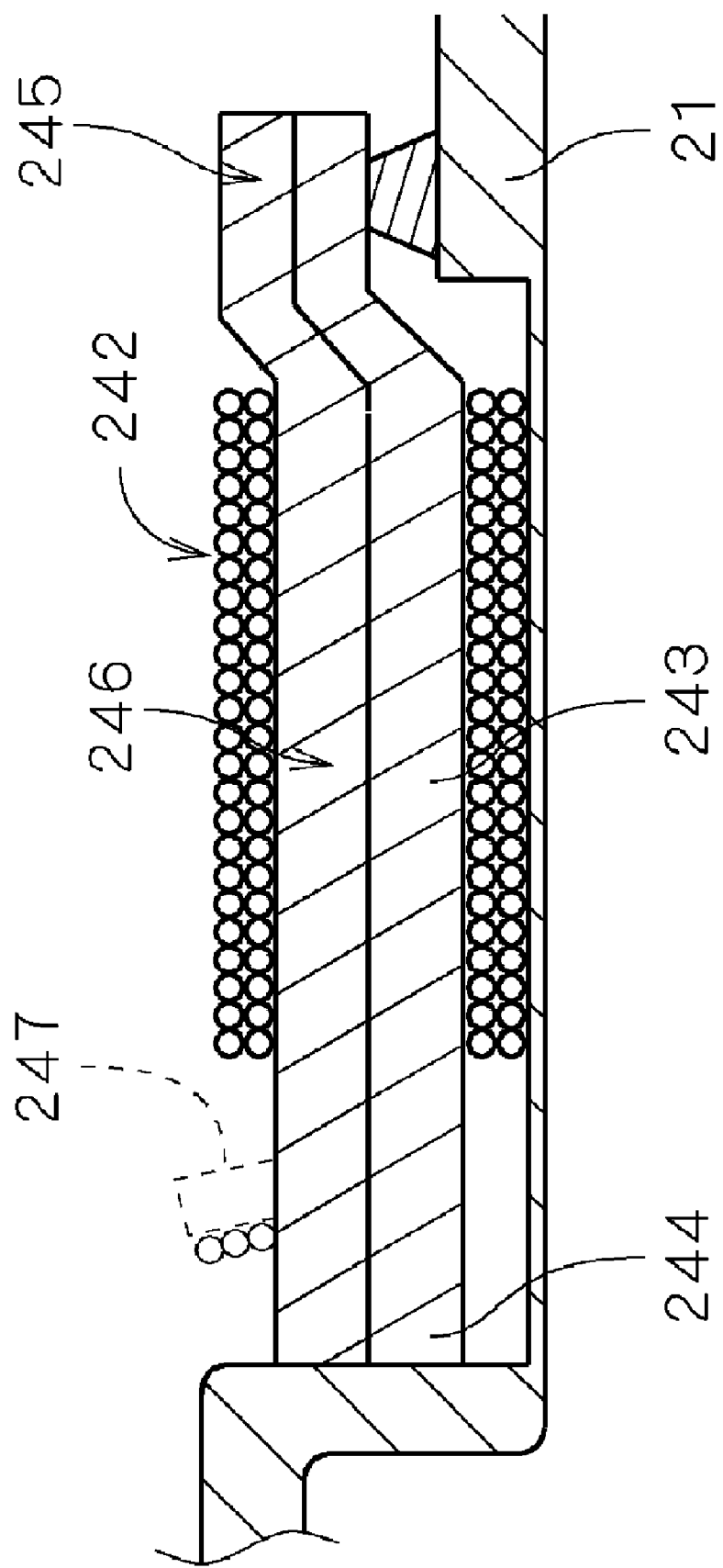
FIG. 7 is a longitudinal cross-sectional view illustrating portions of the stator and the base plate, in an enlarging manner.

FIG. 7 is a longitudinal cross-sectional view illustrating portions of the stator 24 and the base plate 21, in an enlarging manner, by focusing attention on a single tooth 243. As illustrated in FIG. 7, the coils 242 are formed from wires wound around the wire-wound portions 246 between the magnet-facing portions 245 of the teeth 243 and the supporting ring 244 into two layers. The wires extended from the respective coils 242 are directed to a circuit board 248 illustrated in FIG. 6 through bridging-wire engaging protrusions 247 and are bonded to an electrode on the circuit board 248 through soldering.

Figure 8:
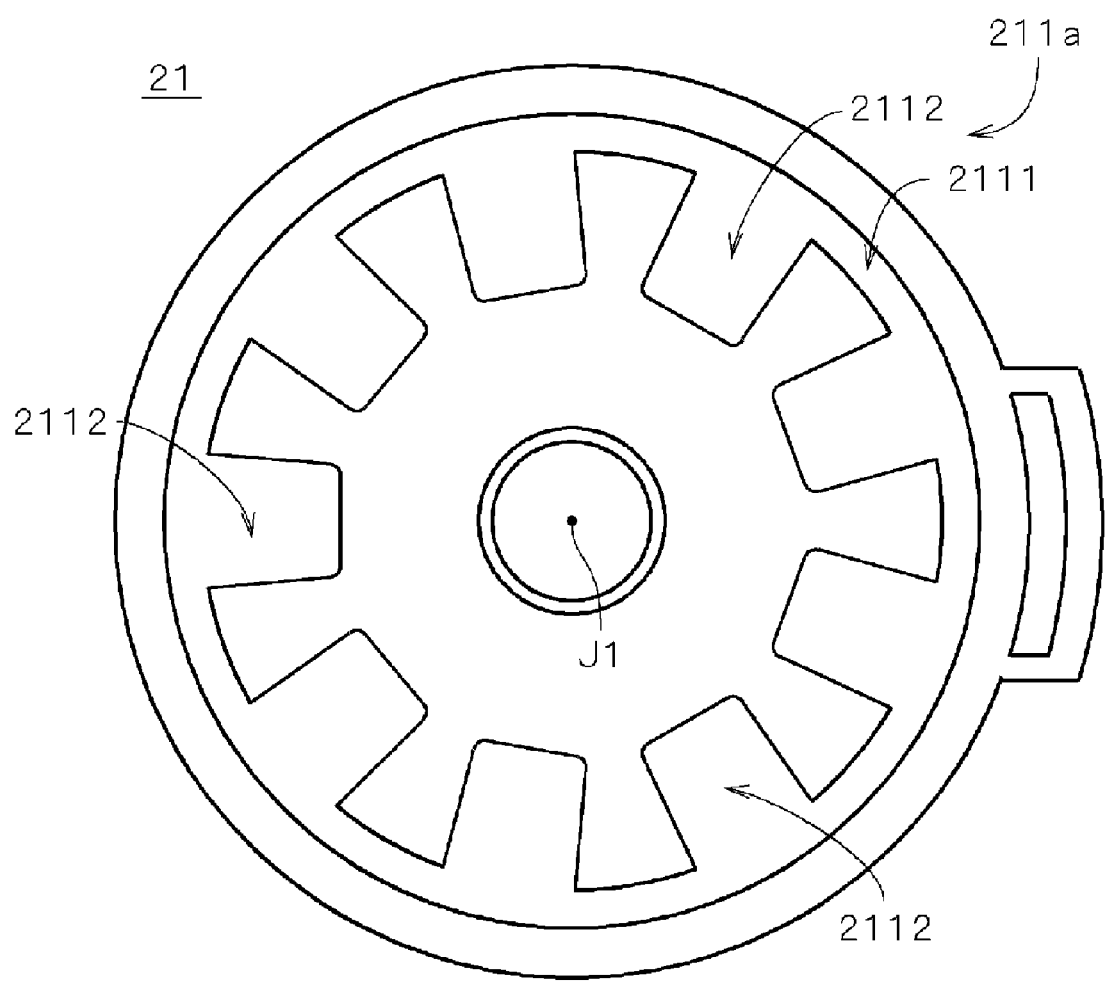
FIG. 8 is a plan view illustrating the base plate.

FIG. 8 is a plan view illustrating the base plate 21. As illustrated in FIG. 8, a single recessed portion 211*a* is formed on the base plate 21 at the portions to be aligned with the supporting ring 244 and the plural teeth 243. The recessed portion 211*a* includes an annular recessed portion 2111 which is an annular-shaped recessed portion formed about the center axis J1 at the portion alighted with the supporting ring 244 and a teeth housing recessed portion 2112 consisting of plural recessed portions at the portions alighted with the plural teeth 243. The plural teeth housing recessed portions 2112 which are circumferentially arranged about the center axis J1 are coupled to one another through the annular recessed portion 2111. The base plate 21 has a thickness in the range of 0.1 mm to 1 mm at the portions thereof around the recessed portion 211*a*, similarly to in the first embodiment.

As illustrated in FIG. 6, in the respective teeth housing recessed portions 2112, the lower portions of the wire-wound portions 246 of the corresponding teeth 243 are inserted, while the lower portion of the supporting ring 244 is inserted in the annular recessed portion 2111. Further, in the recessed portion 211*a*, the lower end surfaces of the wire-wound portions 246 and the supporting ring 244 are positioned between the upper main surface and the lower main surface of the base plate 21. Further, the lower end surfaces of the coils 242 provided around the wire-wound portions 246 are also positioned between the upper main surface and the lower main surface of the base plate 21. In other words, portions of the plural teeth 243, the supporting ring 244 and the plural coils 242 are housed in the recessed portion 211*a* of the base plate 21.

In the stator 24, an adhesive 210 is filled in the recessed portion 211*a* in which the teeth 243 the supporting ring 244 and the coils 242 are inserted, so that the teeth 243, the supporting ring 244 and the coils 242 are secured therein. Further, similarly to in the first embodiment, the base plate 21 is provided with plural protrusion-type teeth supporting portions 213 which abut the lower portions of the magnet-facing portions 245 of the plural teeth 243 for supporting the magnet-facing portions 245.

As previously described, similarly to in the first embodiment, the lower end surfaces of the wire-wound portions 246 of the teeth 243 are positioned between the upper surface and the lower surface of the base plate 21, which enables reducing the thickness of the motor 1*a* without excessively reducing the thickness of the base plate 21. Particularly, the lower end surface of the supporting ring 244 is also positioned between the upper surface and the lower surface of the base plate 21, which enables further reducing the thickness of the motor 1*a*.

Further, similarly to in the first embodiment, the base plate 21 can be formed to have a thickness in the range of 0.1 mm to 1 mm, which can prevent the deformation of the base plate 21 due to vibrations and the like during the driving of the motor 1*a* and also can realize reduction of the thickness of the motor 1*a*. This motor 1*a* is also particularly suitable as the driving power source of a disk driving device such as a hard-disk device which has been required to have a further reduced thickness.

Further, with the adhesive 210 filled in the recessed portion 211*a* and the teeth supporting portions 213 for supporting the magnet-facing portions 245 at their lower sides, it is possible to suppress the vibrations of the teeth 243 during the operation of the motor 1*a*, thereby suppressing the occurrence of PESs, Puretones and RROs caused by vibrations of the teeth 243, similarly to in the first embodiment.

While the embodiments of the present invention have been described, the present invention is not limited to the aforementioned embodiments and various changes can be made thereto.

In the first embodiment, the lower portion of the wire-wound portion 246 of a single tooth 243 is inserted in each of the nine through holes 211 formed in the base plate 21. However, the wire-wound portions of two or more teeth may be inserted in a single through hole. For example, three through holes may be formed in the base plate and the lower portions of the wire-wound portions of three teeth may be inserted in each through hole.

In the second embodiment, the recessed portion 211a is shaped to include the annular recessed portion 2111 and nine teeth housing recessed portions 2112 extended inside the annular recessed portion 2111. The recessed portion may be formed to have a large-width annular shape including an annular recessed portion and nine teeth housing recessed portions. Also, the recessed portion may be formed to have axially-through portions at the portions alighted with the wire-wound portions of the teeth. In such a case, nine through holes are provided at the bottom surface of the portion of the recessed portion other than the annular recessed portion.

While, in the aforementioned embodiments, the teeth supporting portions 213 are formed from plural protruding portions, a substantially-annular protruding portion, for example, may be provided about the center axis J1, as a teeth supporting portion. Also, three protruding portions may be circumferentially arranged at even intervals about the center axis J1.

The motors according to the aforementioned embodiments are so-called inner-rotor type motors including a rotor magnet 34 placed near the center axis J1 of the stator 24. Also, the motor may be an outer-rotor type motor including a rotor magnet 34 placed outside of the stator 24. Also, the motor bearing mechanism may be, for example, a ball bearing.

The motors according to the aforementioned embodiments may be utilized as the driving power sources of other devices than hard disk devices (for example, disk driving devices such as removable disk devices).

What is claimed is:

1. A motor comprising:
   a rotor section rotatable about a center axis and including a rotor magnet;
   a stationary section including a stator and a base portion which is disposed axially below the stator, wherein the stator is opposed to the rotor magnet in a radial direction substantially perpendicular to the center axis and includes a supporting ring fixed to the base portion, a plurality of teeth extending from the supporting ring toward the rotor magnet and each having a radial end facing the rotor magnet, and a coil formed by a wire wound around a portion of each tooth, wherein the portion of each tooth having the wire wound there around defines a wire wound portion of each tooth; and
   a bearing section operable to support the rotor section in a rotatable manner relative to the stationary section, wherein
   the supporting ring and the teeth are integral with each other, and the wire-wound portion of each tooth is axially depressed in a direction towards the base portion between the supporting ring and the radial end of the tooth such that an axially lower surface of the entire wire-wound portion of each tooth is lower than an axially lower surface of the supporting ring and an axially lower surface of the radial end of the teeth,
   the base portion has a receiving portion which receives a portion of the stator therein such that an axially lower end of the coil and the axially lower surface of the wire-wound portion of each tooth are located between an axially upper surface and an axially lower surface of the base portion.

2. The motor according to claim 1, wherein the stator is formed by a plurality of thin plates which are axially laminated, and each of the thin plates is bent at two positions to form the wire-wound portion.

3. The motor according to claim 1, wherein the rotor magnet is disposed radially outside the stator.

4. The motor according to claim 1, wherein the base portion has a through hole as the receiving portion.

5. The motor according to claim 4, wherein the base portion further includes a sealing member which closes an axially-lower end of the through hole.

6. The motor according to claim 1, wherein the base portion has a recess as the receiving portion, the recess being axially depressed away from the stator.

7. The motor according to claim 1, wherein the radial end of each tooth of the stator faces the rotor magnet with a radial gap formed therebetween.

8. The motor according to claim 1, wherein the base portion is provided with a recessed portion which is annular about the center axis and axially faces the supporting ring of the stator.

9. The motor according to claim 1, wherein the base portion has an axial thickness in a range of 0.1 mm to 1 mm at a portion around the receiving portion.

10. The motor according to claim 6, wherein the base portion has an axial thickness of 0.4 mm at the portion around the receiving portion.

11. The motor according to claim 1, wherein adhesive is placed in the receiving portion.

12. A disk drive comprising:
    the motor according to claim 1 operable to rotate a disk capable of storing information; and
    an accessing portion operable to carry out at least one of reading information onto and writing information from the disk.

13. The motor according to claim 1, wherein an axial upper surface of the supporting ring and an axial upper surface of the radial end of each tooth is lower than an axial upper surface of each coil.

* * * * *